United States Patent
Roberts et al.

(10) Patent No.: US 7,305,183 B2
(45) Date of Patent: Dec. 4, 2007

(54) MEASUREMENT OF POLARIZATION DEPENDENT LOSS IN AN OPTICAL TRANSMISSION SYSTEM

(75) Inventors: Kim B. Roberts, Nepean (CA);
Giuseppe G. Bordogna, Ottawa (CA);
Riyaz R. Jamal, Nepean (CA);
Douglas D. McGhan, Ottawa (CA);
Maurice S. O'Sullivan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 582 days.

(21) Appl. No.: 09/975,985

(22) Filed: Oct. 15, 2001

(65) Prior Publication Data

US 2003/0039005 A1    Feb. 27, 2003

Related U.S. Application Data (60) Provisional application No. 60/314,663, filed on Aug. 27, 2001.

(51) Int. Cl.
*H04B 10/08* (2006.01)
*H04B 17/00* (2006.01)
*H04B 10/00* (2006.01)
*H04J 14/06* (2006.01)

(52) U.S. Cl. .................... 398/28; 398/152; 398/65; 398/16

(58) Field of Classification Search .............. 398/9, 398/16, 25, 28, 33, 34, 65, 152; 250/225
See application file for complete search history.

(56) References Cited

U.S. PATENT DOCUMENTS

| 4,823,360 | A | 4/1989 | Tremblay et al. ............. 375/4 |
| 5,416,626 | A | 5/1995 | Taylor ..................... 359/156 |
| 5,513,029 | A | 4/1996 | Roberts ................... 359/177 |
| 6,222,652 | B1 | 4/2001 | Roberts | |
| 6,483,620 | B1 * | 11/2002 | Epworth et al. ........... 398/29 |
| 2001/0052973 | A1 * | 12/2001 | Marro et al. ............ 356/73.1 |
| 2002/0149823 | A1 * | 10/2002 | Bergano et al. ........... 359/156 |
| 2004/0016874 | A1 * | 1/2004 | Rao et al. ................. 250/225 |

FOREIGN PATENT DOCUMENTS

| EP | 0 553 460 A | 8/1993 |
| EP | 0 615 356 A | 9/1994 |
| EP | 0 964 537 A | 12/1999 |
| GB | 2 328 572 A | 2/1999 |

* cited by examiner

*Primary Examiner*—Jason Chan
*Assistant Examiner*—Nathan M Curs
(74) *Attorney, Agent, or Firm*—Kent Daniels; Ogilvy Renault LLP (57) ABSTRACT

A method and system enables measurement of polarization dependent loss (PDL) in an optical communications system including a plurality of cascaded optical components. An optical signal having a predetermined initial polarization state is launched into the optical communications system. A polarization state of the signal is detected at a selected detection point downstream of the launch point. The PDE is evaluated using the predetermined initial polarization state and the detected polarization state.

36 Claims, 5 Drawing Sheets

MEASUREMENT OF POLARIZATION DEPENDENT LOSS IN AN OPTICAL TRANSMISSION SYSTEM

CROSS-REFERENCE TO RELATED APPLICATIONS

This application is based on, and claims priority of, U.S. Patent Application No. 60/314,663, filed Aug. 27, 2001.

MICROFICHE APPENDIX

Not Applicable.

TECHNICAL FIELD

The present invention relates to optical transmission systems for optical communications, and in particular to a method and system for monitoring polarization dependent loss in an optical transmission system.

BACKGROUND OF THE INVENTION

Optical transmission systems for optical communications typically include a pair of network nodes connected by an optical waveguide (i.e., fiber) link. Within each network node, optical signals are converted into electrical signals for signal regeneration and/or routing. Exemplary network nodes of this type include Add-Drop-Multiplexers (ADMs), routers, and cross-connects. The optical link between the network nodes is typically made up of multiple concatenated optical components, including two or more (and possibly 20 or more) optical fiber spans (e.g., of 40-60 km in length) interconnected by optical (e.g., Erbium) amplifiers.

The use of concatenated optical components within the link enables improved signal reach (i.e., the distance that an optical signal can be conveyed before being reconverted into electrical form for regeneration). Thus, for example, optical signals are progressively attenuated as they propagate through a span, and amplified by an optical amplifier prior to being launched into the next adjoining span. However, each optical component exhibits polarization dependent effects, which may be manifested as either polarization dependent loss (in the case of filters, isolators, and fiber), or polarization dependent gain (in the case of optical amplifiers). Within discrete optical components such as filters, isolators and amplifiers, the polarization dependent effects are typically a function of wavelength. Within fiber, polarization dependent losses are a function of wavelength, but may also vary with stress, bending radius, and vibration of the fiber.

When considering the effects of polarization dependent loss/gain on a signal, it is convenient to consider the PDE as a vector quantity, and this terminology is used herein. A more rigorous treatment of PDE is provided in "Polarized Light" (Edward Collett, ISDN 0-847-8729-3). When multiple optical components are concatenated to form a link, the polarization dependent effect exhibited by the resulting system is the vector sum of the polarization dependent effects introduced by each of the various components, transformed by the polarization coupling between successive elements of the link. Because the polarization dependent effect of fiber is affected by environmental conditions, the vector sum will tend to be a bounded statistical entity having a static and a dynamic components. The static component is environmentally insensitive, and can be compensated by appropriate tuning of optical detectors in the receiving node. However, the dynamic component is (possibly rapidly) time-varying, and manifests itself as transient noise in received optical signals. This transient noise degrades the signal-to-noise ratio, and thereby impairs the performance of the optical transmission system.

Various equipment is known for measuring polarization dependent effects in a laboratory. However, laboratory measurements can only be used as estimates of the PDE of installed network links, because it is very difficult to duplicate, in a laboratory, all of the factors affecting PDE in the installed system. Furthermore, installation of such laboratory equipment in installed network links is generally impractical.

A method and system for monitoring transients caused by polarization dependent effects is disclosed in United Kingdom Patent Application No. 2328572A, entitled "Detecting Transients In An Optical Transmission System", which was published on Feb. 24, 1999. According to this method, transients are measured at a receiving end of a link, and compared to known features of causes of transient effects. Thus, for example, the rise-time, peak value and pulse shape of a signal transient can be analyzed and compared to a database of known transient features to estimate whether the detected transient is caused by, for example, mode hopping in an optical amplifier or vibration of a fiber (indicated by periodic fluctuations in signal polarization).

In principle, the methods of United Kingdom Patent Application No. 2328572A could be used to measure polarization dependent effects in an installed optical communications network. However, as the number of cascaded optical components within the optical transmission system increases, it becomes increasingly difficult to correctly distinguish transients due to polarization dependent effects from those caused by simple (i.e., non-polarization dependent) attenuation and gain.

Accordingly a reliable technique for measuring polarization dependent effects (i.e., gain or loss) in an installed optical communications network remains highly desirable.

SUMMARY OF THE INVENTION

An object of the present invention is to provide a method and system for measuring polarization dependent effects (i.e., gain or loss) in an optical communications system having multiple cascaded optical components.

Accordingly, an aspect of the present invention provides a method of measuring a polarization dependent effect (PDE) in an optical communications system including a plurality of cascaded optical components. In accordance with the present invention, an optical signal having a predetermined initial polarization state is launched into the optical communications system. A polarization state of the signal is detected at a selected detection point downstream of the launch point. The PDE is evaluated using the predetermined initial polarization state and the detected polarization state.

A further aspect of the present invention provides a system for measuring a polarization dependent effect (PDE) in an optical communications system including a plurality of cascaded optical components. The system comprises: means for launching an optical signal having a predetermined initial polarization state into the optical communications system; a detector adapted to detect a polarization state of the signal at a selected detection point; and a processor adapted to evaluate the PDE using the predetermined initial polarization state and the detected polarization state.

The polarization dependent effect can be either a polarization dependent loss or a polarization dependent gain. For the purposes of simplifying description of the present invention, the following detailed description makes reference to polarization dependent loss (PDL). However, it will be understood that the present invention also encompasses measurement of polarization dependent gain.

The optical signal may be any one of: a data signal; a test signal; and an Amplified Spontaneous Emission (ASE) signal.

In some embodiments, the predetermined initial polarization state is substantially time-invariant.

The predetermined initial polarization state may be defined by a degree of polarization of the optical signal launched into the optical transmission system. In such cases, the polarization state of the signal can be detected by detecting the degree of polarization of the optical signal at the detection point. This may be accomplished by splitting the optical signal into orthogonally polarized light beams; detecting a respective power level of each of the orthogonally polarized light beams; and then evaluating the degree of polarization from the detected power levels.

Alternatively, the predetermined initial polarization state may be defined as respective known initial power levels of orthogonally polarized signal components multiplexed into the optical signal. In such cases, the polarization state of the signal can be detected by detecting respective power levels of each of the orthogonally polarized signal components. This may be accomplished by de-multiplexing each of the orthogonally polarized signal components from the optical signal; and measuring respective eye openings of each of the de-multiplexed signal components.

Polarization dependent loss (or gain) may be evaluated by calculating a vector difference between the detected polarization state and the initial polarization state.

In some embodiments, the predetermined initial polarization state comprises a predetermined variation of a polarization vector of the optical signal. This predetermined variation of the polarization vector may be a rotation of the polarization vector in accordance with a predetermined dither pattern. In such cases, the predetermined dither pattern may be either one or both of: a step-wise rotation of the polarization vector between orthogonal directions; and a small-scale perturbation of a polarization angle of the polarization vector. The polarization state of the signal can be measured by detecting a degree of polarization of the optical signal as a function of time. Based on this information, the PDL can be evaluated by calculating a correlation between the predetermined dither pattern and the detected degree of polarization of the optical signal as a function of time.

In other embodiments, the predetermined variation of the polarization vector is a variation of respective power levels of orthogonally polarized signal components multiplexed into the optical signal, in accordance with respective orthogonal dither patterns. Here again, the polarization state of the signal can be detected by detecting a degree of polarization of the optical signal as a function of time. However, in this case, a respective PDE can be calculated for each of the orthogonally polarized signal components. A respective PDE for each of the orthogonally polarized signal components can be calculated, for each signal component, by: detecting a power level of the received light beam as a function of time; calculating respective correlations between the predetermined dither patterns and the detected power level; and evaluating the respective PDE as a ratio of the lesser of the calculated correlations to the sum of the calculated correlations.

Once the PDE has been determined, it can be used for control and/or management of the optical transmission system, as desired. For example, the measured PDE can be compared to a threshold, and the comparison result used to as an indication of the performance of the optical transmission system.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following description of preferred embodiments, and the claims, refer to the measurement of Polarization Dependent Loss (PDL); that is, differential attenuation of an optical signal depending on its polarization direction. It will be appreciated, however, that the same description applies equally to polarization dependent gain. Thus each reference to Polarization Dependent Loss (PDL) shall be understood to also include polarization dependent gain.

Figure 1:
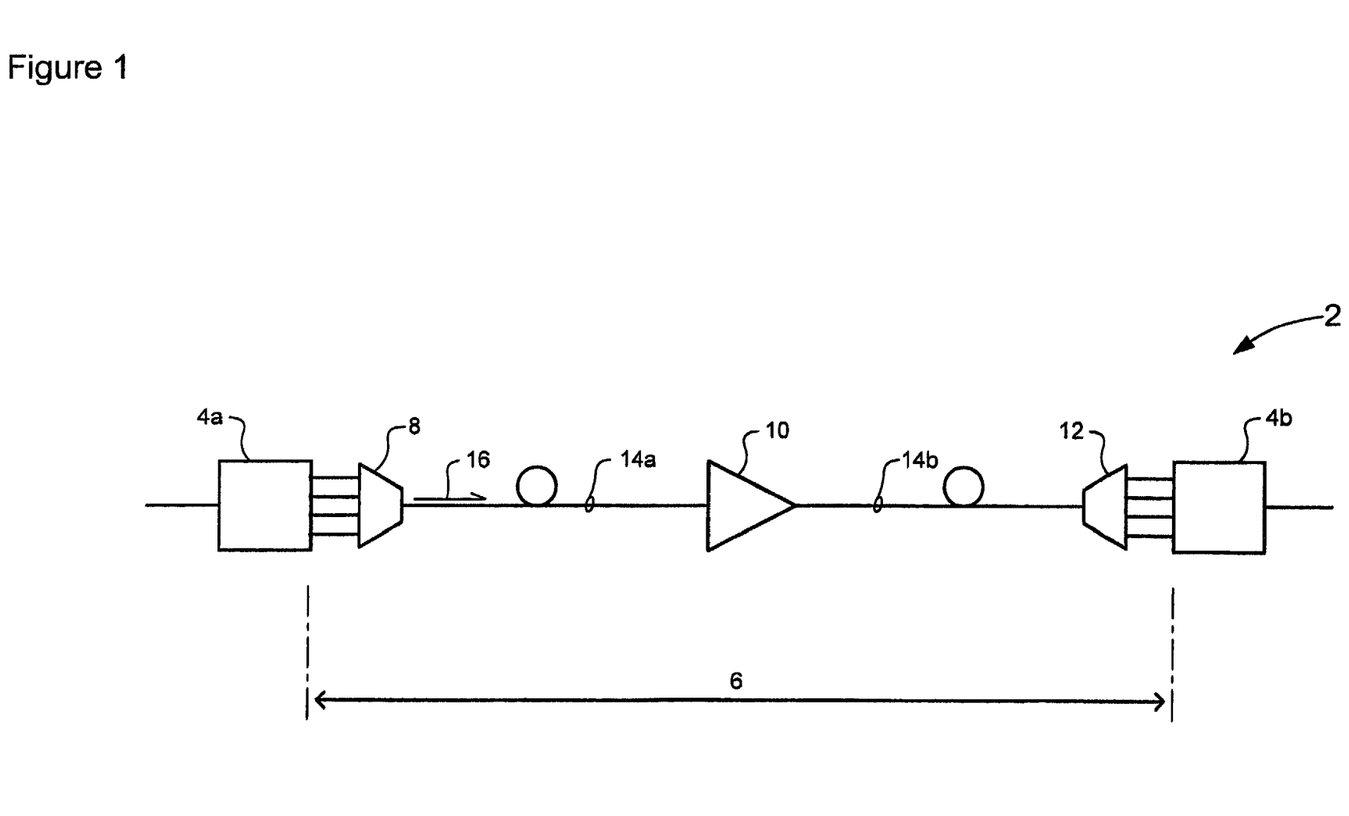
FIG. 1 is a block diagram schematically illustrating principle elements of an optical transmission system in which the present invention may be deployed.

The present invention provides a method and system for measuring polarization dependent loss (and/or gain) in an optical transmission system. In general, an optical signal having an initial polarization state is launched into the transmission system, and the polarization state of the optical signal is detected at a selected detection point. The polarization dependent loss (and/or gain) is then evaluated from the initial and detected polarization states. FIG. 1 is a block diagram schematically illustrating principle elements of an exemplary optical transmission system in which the present invention may be deployed.

As shown in FIG. 1, the optical transmission system 2 comprises a pair of network nodes 4a and 4b interconnected by a link 6. The network nodes 4 may be any discrete electro-optical network devices (such as, for example, routers, add-drop multiplexers, etc) known in the art. Similarly, the link 6 may be provided as a cascade of interconnected optical components in a manner well known in the art. For the purposes of description of the present invention, the link 6 comprises an optical multiplexer 8, an optical amplifier 10, and an optical de-multiplexer 12, all of which are interconnected by optical fiber spans 14. However, it will be understood that the present invention is not limited to such embodiment.

In general, traffic in the optical transmission system 2 may be bi-directional. However, in order to simplify the following description of the invention, data traffic within at least the link 6 will be considered to be uni-directional, being launched into the link 6 by sending node 4a, and propagating in a so-called "forward" direction 16 through the link 6 to receiving node 4b.

The present invention provides a method and system for measuring polarization dependent loss (PDL) incurred by an optical signal as it propagates through the link 6 of the optical transmission system 2. In accordance with the present invention, an optical signal 16 having a known initial polarization state is launched into (and through) the link 6. The polarization state of the optical signal 16 is detected at a selected detection point, and the PDL evaluated from the initial and detected polarization states. In principle, the detection point can be positioned at any desired location along the link 6 (downstream of the sending node 4a). In some cases, it may be advantageous to use one or more detection points at respective intermediate locations along the length of the link 6, as this may assist in isolating a source of PDL. However, in order to simplify description of the present invention, a single detection point located at the receiving node is used in the illustrated embodiments. This arrangement is useful in that it provides a measure of PDL that may be used to enable real-time performance optimization of the receiving node 4b.

Figure 2:
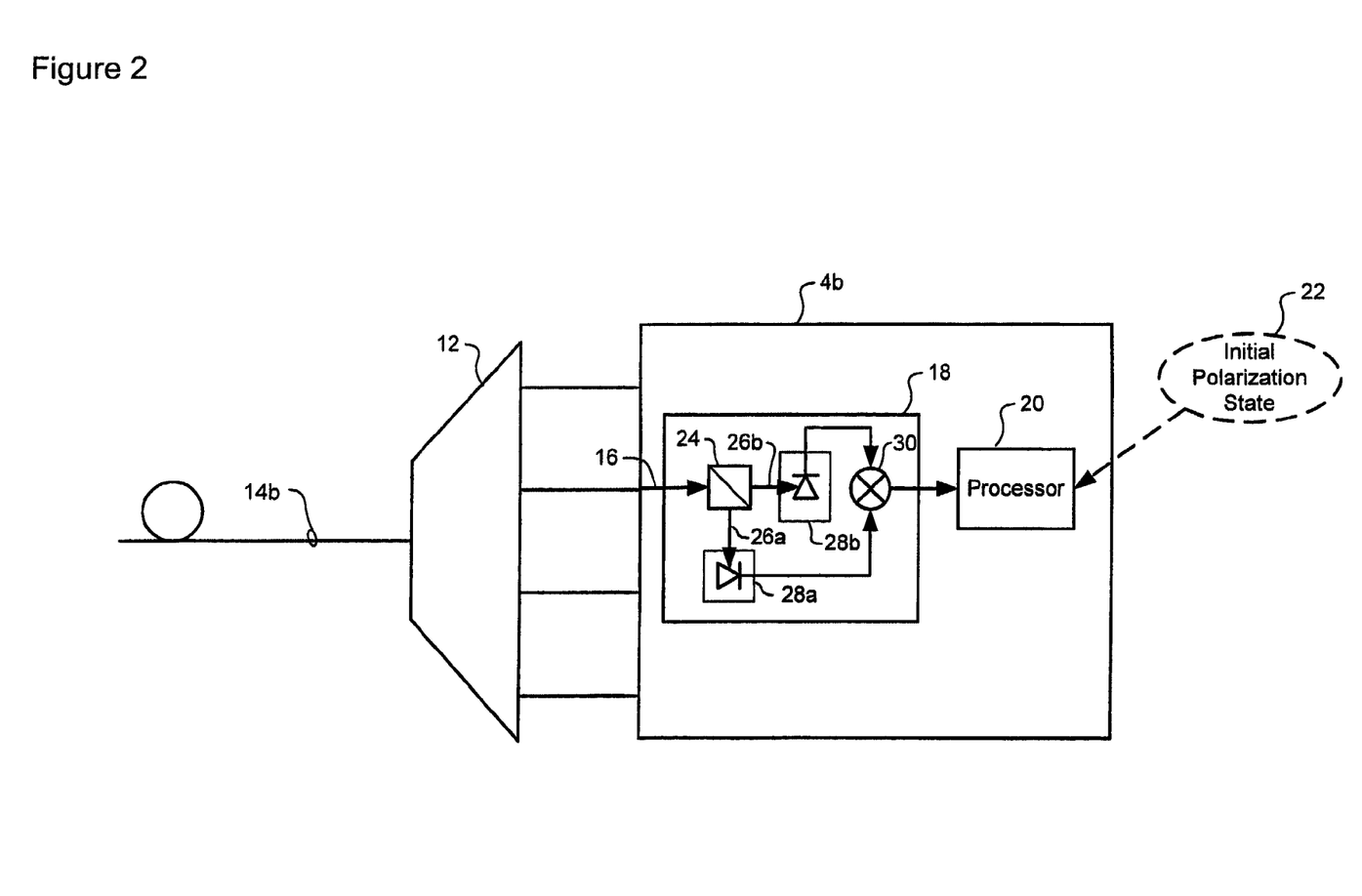
FIG. 2 is a block diagram schematically illustrating operation of a system in accordance with a first embodiment of the present invention.

FIG. 2 is a block diagram schematically illustrating operation of a system in accordance with a first embodiment of the present invention. In the embodiment of FIG. 2, an optical signal 16 received by the receiving node 4b is supplied to a polarization detector 18, which operates to measure a polarization state of the received signal 16. The measured polarization state is then supplied to a processor 20 which operates to compare the measured polarization state with a previously known initial polarization state 22 of the optical signal 16. The comparison result provides a direct indication of changes in the polarization state of the optical signal 16 (and thus of PDL) through the optical transmission system 2.

Various methods known in the art may be used to measure the polarization state of the received optical signal 16. For example, a polarizing beam splitter 24 may be used to split the received optical signal 16 into a pair of beams 26a, 26b having respective orthogonal polarization directions, and the signal power of each beam measured by respective photo detectors 28a, 28b, as shown in FIG. 2. Similarly, the polarization state may be represented in a variety of different ways including, for example, detected power levels of each orthogonal polarization direction, a difference or proportionality ratio between these two power levels, or a vector quantity derived from any of the foregoing. In the embodiment of FIG. 2, a multiplier block 30 is used to generate a signal indicative of a proportionality ratio between the two detected power levels.

In the embodiment of FIG. 2, the measured polarization state is based on the bulk optical properties of the received optical signal 16. That is, no regard is taken to the formatting of the optical signal 16. Consequently, any light beam conveyed through the optical transmission system may be used as the optical signal 16 in the embodiment of FIG. 2, provided that its initial polarization state is known. Thus, for example, an initially un-polarized beam (which may be a data signal, a test signal, or an Amplified Spontaneous Emission (ASE) noise signal) may be used with acceptable results. In order to provide measurements of PDL that are relevant to the performance of the receiving node 4b, it is advantageous to use a received optical signal 16 having a wavelength corresponding to a channel wavelength of the optical transmission system 2. In this case, either data or test signals may be used. Because PDL is known to be strongly wavelength dependent, it is preferable to perform parallel measurements of received polarization state for each channel of the optical transmission system 2.

Figure 3:
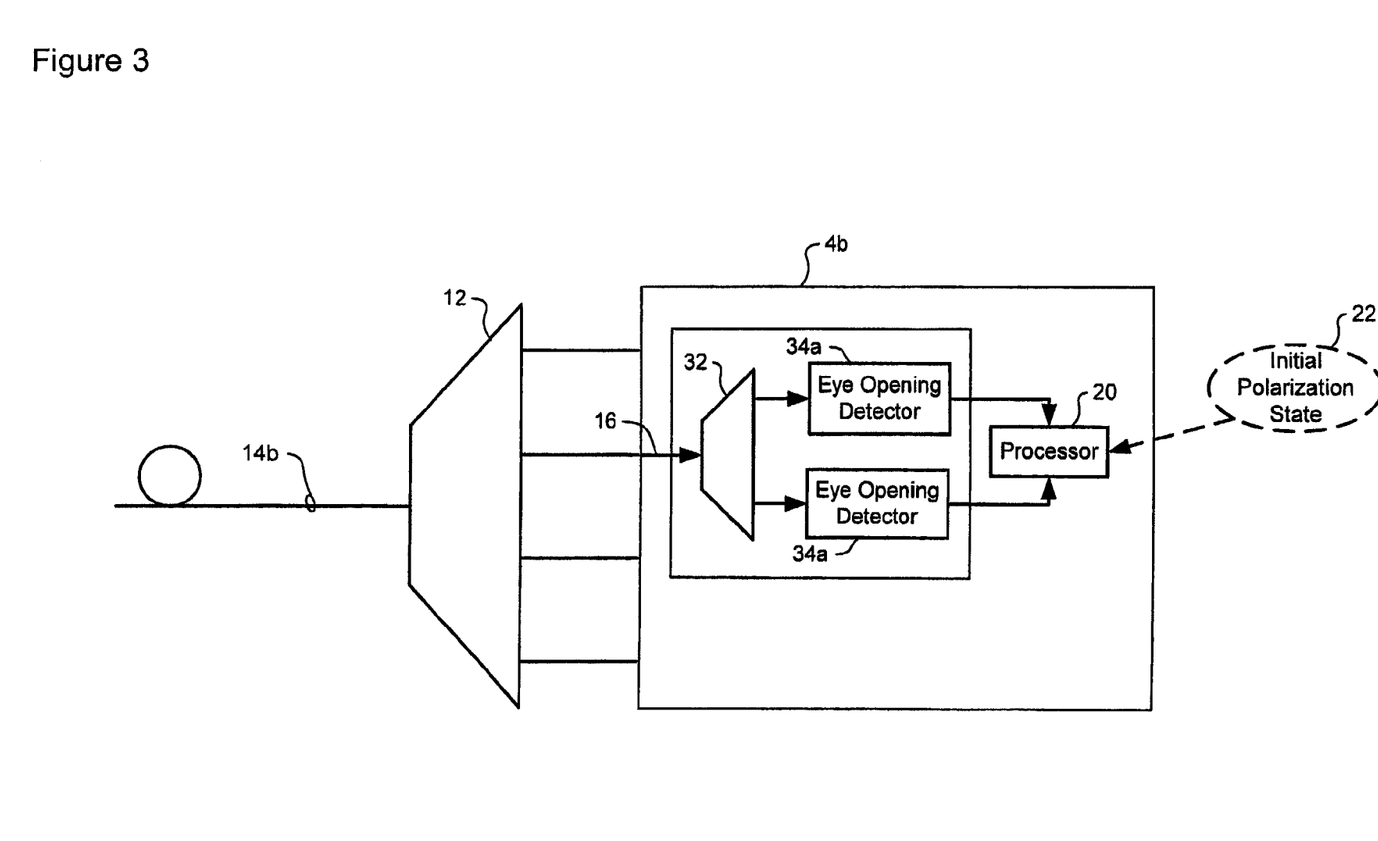
FIG. 3 is a block diagram schematically illustrating operation of a system in accordance with a second embodiment of the present invention.

The embodiment of FIG. 3 is similar to that of FIG. 2, in that the polarization state of the received optical signal 16 is measured and compared to a previously known initial polarization state. However, the embodiment of FIG. 3 differs from that of FIG. 2 in that the polarization state is determined by analysis of the known format of the optical signal 16. In particular, in the embodiment of FIG. 3, the optical signal 16 is a test or data signal composed of orthogonally polarized signal components that are multiplexed (or interleaved) together, in the sending node 4a, in a manner well known in the art. In this case, a de-multiplexer 32 is used to extract the signal components from the received optical signal 16 in a known manner. Respective eye openings of each of the signal components are then measured (at 34), again in a known manner. These measured eye openings can then be used in a manner directly analogous to the signal power levels detected in the embodiment of FIG. 2, to derive an indication of the polarization state of the received light beam.

As will be appreciated, the initial polarization state of the optical signal 16 can be defined by the respective power levels of each of the orthogonally polarized signal components of the optical signal 16 launched into the link 6 by the sending node 4a. In some cases, the respective power levels will be equal to one another, in which case the optical signal 16 can be considered as being initially un-polarized. Alternatively, the power levels may be adjusted (e.g., during installation of the sending node 4a) in an effort to offset the effects of at least a fixed portion of polarization dependent loss of the link 6. In such cases, the optical signal 16 launched into the link 6 by the sending node will be at least partially polarized. In either case, the initial polarization state 22 of the optical signal 16 launched by the sending node 4a can be compared to the polarization state measured by the polarization detector 18 to determine PDL within the link 6.

Figure 4:
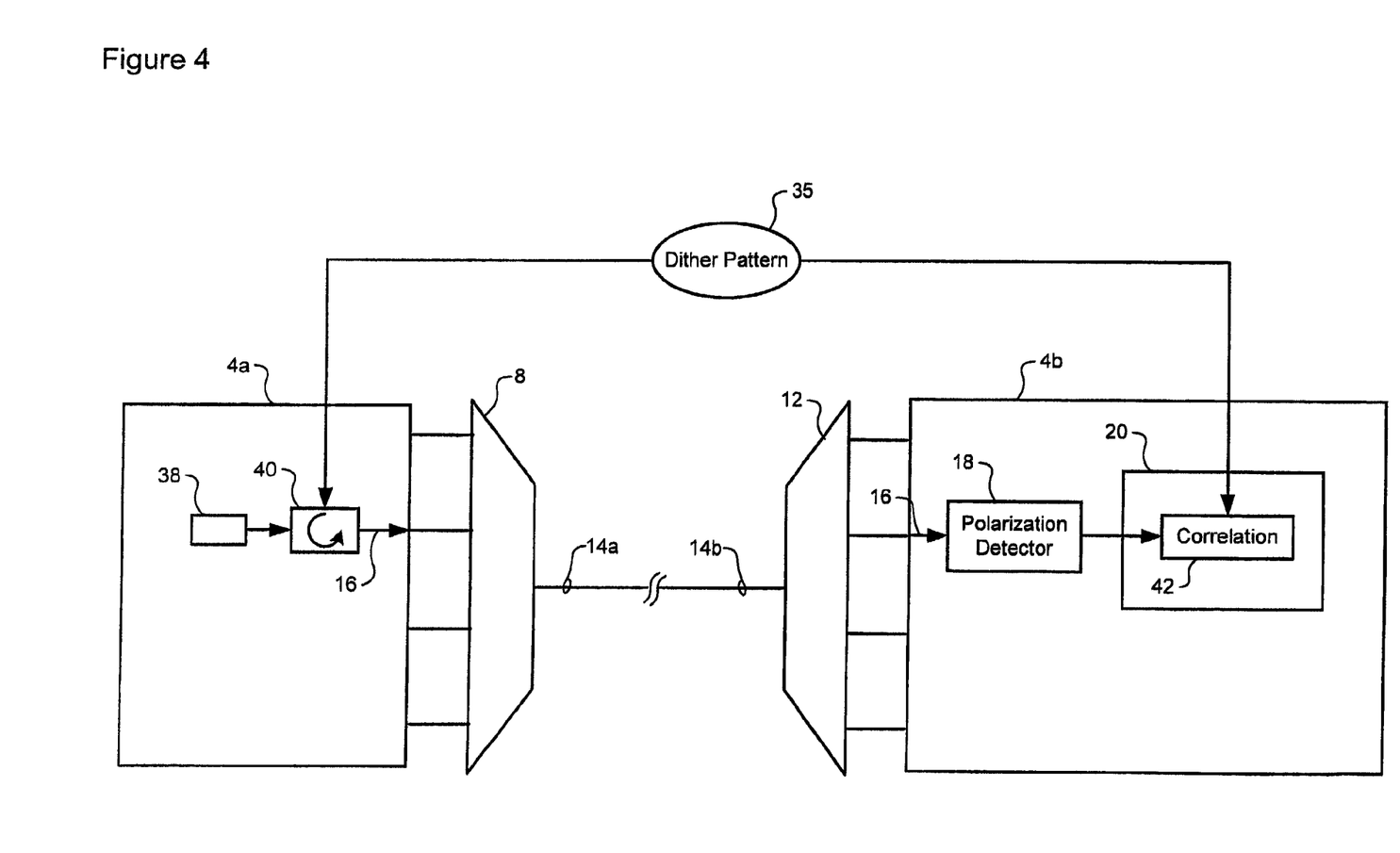
FIG. 4 is a block diagram schematically illustrating operation of a system in accordance with a third embodiment of the present invention.
Figure 5:
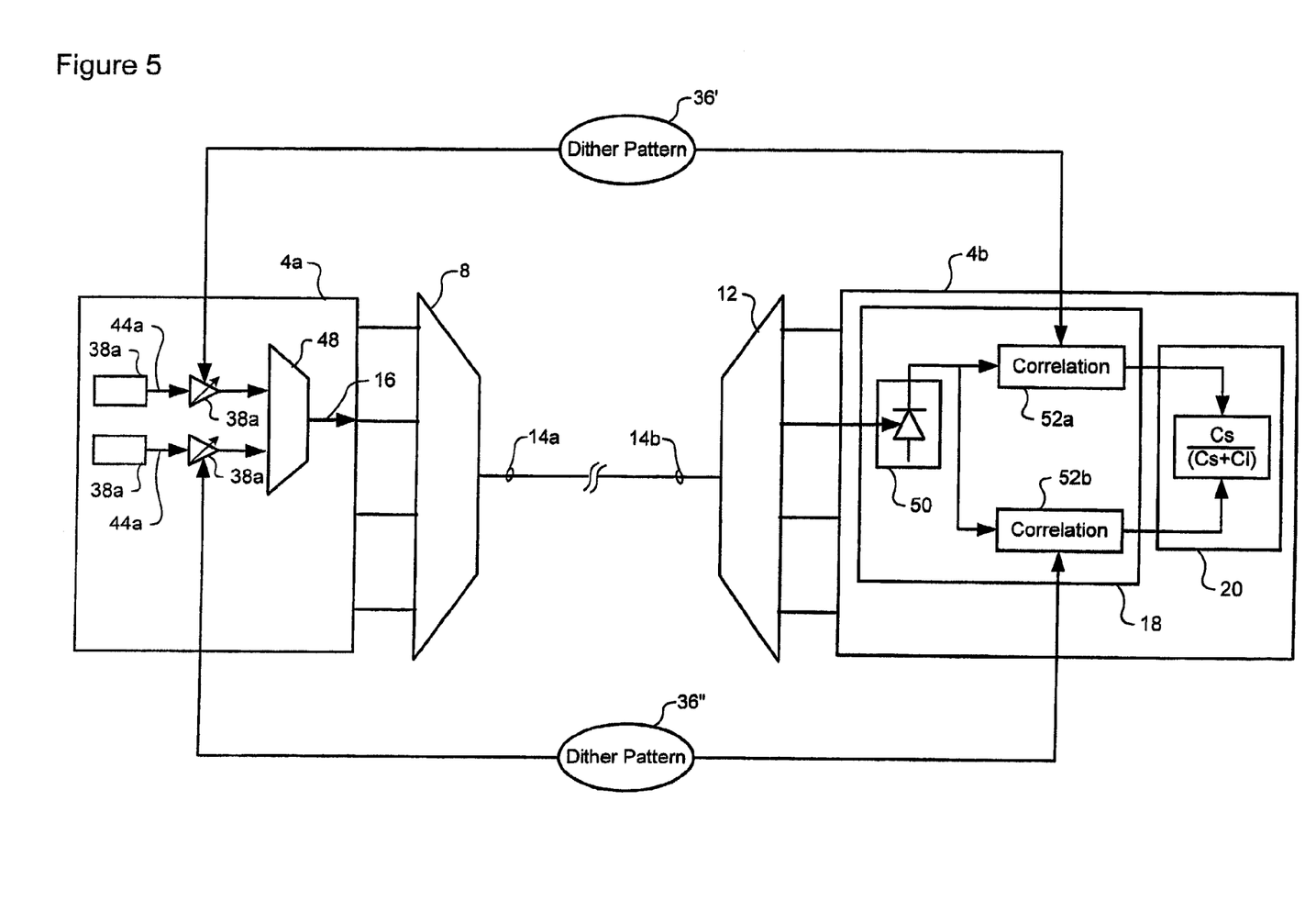
FIG. 5 is a block diagram schematically illustrating operation of a system in accordance with a fourth embodiment of the present invention.

In the embodiments of FIGS. 2 and 3 above, the initial polarization state of the optical signal 16 launched into the optical transmission system by the sending node is known in advance, and is substantially time-invariant. Accordingly, "single-ended" determination of PDL can be accomplished by the detection and analysis of the optical signal 16 downstream of the sending node 4a (i.e., within the receiving node 4b in the embodiments of FIGS. 2 and 3). FIGS. 4 and 5 are block diagrams schematically illustrating respective embodiments of the present invention, utilizing a "double-ended" determination of PDL. In both cases, the initial polarization state of the optical signal 16 launched into the optical transmission system comprises a known variation (or dither) of the polarization vector, rather than the polarization vector itself. Accordingly, detection of the polarization state at a downstream detection point (i.e., the receiving node 4b) involves detection of variations in the signal power consistent with the variation imposed on the launched optical signal 16. Polarization dependent loss in the optical transmission system 2 can then be determined from a calculated correlation between the variations imposed on the launched optical signal 16, and the detected variations in the received optical signal 16.

In the embodiment of FIG. 4, the initial polarization state comprises a rotation of the polarization vector in accordance with a predetermined dither pattern 36. Thus a signal generator 38 operates in a manner well known in the art to generate an optical signal having a substantially fixed (i.e., time-invariant) polarization. This signal is then supplied to a polarization rotator 40 which imposes a rotation of the polarization vector in accordance with the dither pattern 36. The imposed rotations of the polarization vector can be full scale (that is, a stepwise rotation of the polarization vector between orthogonal directions), which is particularly useful for determining PDL in each of the orthogonal directions. Alternatively, small scale rotations of the polarization vector about a predetermined mean polarization direction, can be used to analyze the manner in which PDL changes with changing polarization direction, and as such are useful for fine grained tuning of the receiving node.

In general, the polarization vector of the launched optical signal 16 can be varied at any suitable rate in order to obtain a desired information. For example, if it is desired to track relatively long term (or time averaged) PDL changes while ignoring short duration transients, then a comparatively low variation rate (e.g., on the order of 1 kilohertz) may suitably be used. On the other hand, if it is desired to track and/or analyze short duration PDL transients, then a comparatively high speed variation in polarization (e.g., on the order of 100 kilohertz) will be found to be more suitable.

As shown in FIG. 4, the polarization state of the optical signal 18 received by the receiving node 4b can be detected using a polarization detector 18 of the type described above with reference to the embodiment of FIG. 2. However, in this case, the output of the polarization detector 18 will contain at least one time varying component that is consistent with the dither pattern imposed on the polarization angle of the launched optical signal 16. It is therefore possible to calculate a correlation (at 42) between the polarization detector output and the predetermined dither pattern 36, using techniques well known in the art, to obtain an indication of PDL in the optical transmission system 2.

FIG. 5 illustrates an alternative embodiment in which the optical signal 16 is composed of orthogonally polarized signal components 44a, 44b of the type described above with respect to the embodiment of FIG. 3. In this case, the launched power level of each of the orthogonally polarized signal components 44a, 44b can be varied (e.g., by variable attenuators 46a, 46b) in accordance with respective predetermined dither patterns 36' and 36", prior to being multiplexed (in a known manner) by optical multiplexer 48. Preferably, the respective dither patterns 34' and 34" are orthogonal, so that the effects of dithering one of the signal components 44a can be discriminated from the effects of dithering the other signal component. A simple example of orthogonal dither patterns is a case in which the launch power of one signal component is held constant while the launch power of the other signal component is varied.

In the embodiment of FIG. 5, the polarization state of the optical signal 16 received at the receiving node 4b is detected by correlating low frequency components of the received optical signal 16 with each of the orthogonal dither patterns 36' and 37". Thus, the received optical signal 16 is sampled (at 50) to obtain the power level as a function of time. As may be appreciated, the detected power level will contain low frequency components consistent with each of the orthogonal dither patterns imposed in the initial power levels of the signal components 44a, 44b. Accordingly, for each dither pattern 36' and 36", a respective correlation can be calculated (at 52a and 52b) with the detected power level of the received beam. With this arrangement, PDL within the optical transmission system can be determined by calculating a ratio of the smaller of the two correlation values ($C_8$) to the sum of the two correlation values ($C_s+C_1$). By calculating respective correlations and PDL values for each of the orthogonal dither patterns 36' and 36", polarization dependent loss for each of the signal components 44a, 44b multiplexed into the launched optical signal 16 can be readily obtained.

Thus it will be seen that the present invention provides a method and system for measuring a polarization dependent effect (PDE) in an optical communications system including a plurality of cascaded optical components. An optical signal having a predetermined initial polarization state is launched into the optical communications system. A polarization state of the signal is detected at a selected detection point downstream of the launch point. The PDE is evaluated using the predetermined initial polarization state and the detected polarization state.

The embodiments of the invention described above are intended to be exemplary only. The scope of the invention is therefore intended to be limited solely by the scope of the appended claims.

We claim:

1. A method of measuring polarization dependent loss/gain (PDL) in an optical communications system including a plurality of optical components, the method comprising:
   receiving an optical signal at a selected detection point of the optical communications system, the optical signal having been launched into the optical communications system with a predetermined initial polarization state;
   detecting a polarization state of the signal; and
   evaluating the PDL using the predetermined initial polarization state and the detected polarization state;
      wherein the step of evaluating the PDL comprises calculating a correlation between the initial polarization state and the detected polarization state.

2. A method as claimed in claim 1, wherein the optical signal comprises any one of: a data signal; a test signal; and an Amplified Spontaneous Emission (ASE) signal.

3. A method as claimed in claim 1, wherein the predetermined initial polarization state is substantially time-invariant.

4. A method as claimed in claim 3, wherein the predetermined initial polarization state comprises a degree of polarization of the optical signal launched into the optical transmission system.

5. A method as claimed in claim 4, wherein the step of detecting the polarization state of the signal comprises a step of detecting a degree of polarization of the optical signal at the detection point.

6. A method as claimed in claim 5, wherein the step of detecting the degree of polarization of the optical signal comprises steps of:
   splitting the optical signal into orthogonally polarized light beams;
   detecting a respective power level of each of the orthogonally polarized light beams; and
   evaluating the degree of polarization from the detected power levels.

7. A method as claimed in claim 3, wherein the predetermined initial polarization state comprises respective known initial power levels of orthogonally polarized signal components multiplexed into the optical signal.

8. A method as claimed in claim 7, wherein the step of detecting the polarization state of the signal comprises a step of detecting respective power levels of each of the orthogonally polarized signal components.

9. A method as claimed in claim 8, wherein the step of detecting the respective power levels comprises steps of:
de-multiplexing each of the orthogonally polarized signal components from the optical signal;
measuring respective eye openings of each of the de-multiplexed signal components.

10. A method as claimed in claim 1, wherein the step of evaluating the PDL comprises a step of calculating a vector difference between the detected polarization state and the initial polarization state.

11. A method as claimed in claim 1, wherein the predetermined initial polarization state comprises a predetermined variation of a polarization vector of the optical signal.

12. A method as claimed in claim 11, wherein the predetermined variation of the polarization vector comprises a rotation of the polarization vector in accordance with a predetermined dither pattern.

13. A method as claimed in claim 12, wherein the predetermined dither pattern comprises either one or both of:
a step-wise rotation of the polarization vector between orthogonal directions; and
a small-scale perturbation of a polarization angle of the polarization vector.

14. A method as claimed in claim 12, wherein the step of detecting the polarization state of the signal comprises a step of detecting a degree of polarization of the optical signal as a function of time.

15. A method as claimed in claim 14, wherein the step of calculating a correlation comprises calculating a correlation between the predetermined dither pattern and the detected degree of polarization of the optical signal as a function of time.

16. A method as claimed in claim 11, wherein the predetermined variation of the polarization vector comprises variation of respective power levels of orthogonally polarized signal components multiplexed into the optical signal, in accordance with respective orthogonal dither patterns.

17. A method as claimed in claim 16, wherein the step of evaluating the PDL comprises steps of:
detecting a power level of each of the received light beams as a function of time;
calculating respective correlations between the respective predetermined dither pattern and the detected power levels; and
evaluating the respective PDL as a ratio of the lesser of the calculated correlations to the sum of the calculated correlations.

18. A system for measuring a polarization dependent loss/gain (PDL) in an optical communications system including a plurality of cascaded optical components, the system comprising:
a transmitter for launching an optical signal having a predetermined initial polarization state into the optical communications system;
a polarization state detector for detecting a polarization state of the signal at a selected detection point; and
a processor for evaluating the PDL using the predetermined initial polarization state and the detected polarization state;
wherein the processor comprises a correlator for calculating a correlation between the initial polarization state and the detected polarization state.

19. A system as claimed in claim 18, wherein the transmitter comprises a polarization rotator for selectively rotating a polarization vector of the optical signal.

20. A system as claimed in claim 18, wherein the transmitter comprises a controller for selectively varying respective power levels of orthogonal signal components multiplexed into the optical signal, in accordance with respective orthogonal dither patterns.

21. A system as claimed in claim 18, wherein the detector comprises:
a beam splitter for splitting the optical signal into respective orthogonally polarized beams; and
means for detecting respective power levels of each of the orthogonally polarized beams.

22. A system as claimed in claim 18, wherein the detector comprises:
a de-multiplexer for de-multiplexing orthogonally polarized signal components from the optical signal; and
means for detecting respective eye openings of each of the orthogonally polarized signal components.

23. A network element for measuring a polarization dependent loss/gain (PDL) in an optical communications system including a plurality of optical components, the network element comprising:
a receiver for receiving an optical signal at a selected detection point of the optical communications system, the optical signal having been launched into the optical communications system with a predetermined initial polarization state;
a polarization state detector for detecting a polarization state of the signal; and
a processor for evaluating the PDL using the predetermined initial polarization state and the detected polarization state;
wherein the processor comprises a correlator for calculating a correlation between the initial polarization state and the detected polarization state.

24. A network element as claimed in claim 23, wherein the optical signal comprises any one of: a data signal; a test signal; and an Amplified Spontaneous Emission (ASE) signal.

25. A network element as claimed in claim 23, wherein the predetermined initial polarization state is substantially time-invariant.

26. A network element as claimed in claim 25, wherein the predetermined initial polarization state comprises a degree of polarization of the optical signal launched into the optical transmission system.

27. A network element as claimed in claim 26, wherein the detector comprises:
a beam splitter for splitting the optical signal into orthogonally polarized light beams;
respective optical detectors for detecting a respective power level of each of the orthogonally polarized light beams; and
a comparator for evaluating the degree of polarization from the detected power levels.

28. A network element as claimed in claim 25, wherein the predetermined initial polarization state comprises respective known initial power levels of orthogonally polarized signal components multiplexed into the optical signal.

29. A network element as claimed in claim 28, wherein the detector comprises:
a de-multiplexer for de-multiplexing each of the orthogonally polarized signal components from the optical signal;
a signal analyzer for measuring respective eye openings of each of the de-multiplexed signal components.

30. A network element as claimed in claim 23, wherein the predetermined initial polarization state comprises a predetermined variation of a polarization vector of the optical signal.

31. A network element as claimed in claim 30, wherein the predetermined variation of the polarization vector comprises a rotation of the polarization vector in accordance with a predetermined dither pattern.

32. A network element as claimed in claim 31, wherein the predetermined dither pattern comprises either one or both of:
- a step-wise rotation of the polarization vector between orthogonal directions; and
- a small-scale perturbation of a polarization angle of the polarization vector.

33. A network element as claimed in claim 31, wherein the detector is operative to detect a degree of polarization of the optical signal as a function of time.

34. A network element as claimed in claim 33, wherein the correlator is operative to calculate a correlation between the predetermined dither pattern and the detected degree of polarization of the optical signal as a function of time.

35. A network element as claimed in claim 30, wherein the predetermined variation of the polarization vector comprises variation of respective power levels of orthogonally polarized signal components multiplexed into the optical signal, in accordance with respective orthogonal dither patterns.

36. A network element as claimed in claim 35, wherein:
- the correlator is operative to calculate respective correlations between each of the predetermined orthogonal dither patterns and the detected power level; and
- the processor further comprises a calculator operative to evaluate the PDL as a ratio of the lesser of the calculated correlations to the sum of the calculated correlations.

* * * * *